Figure 1:
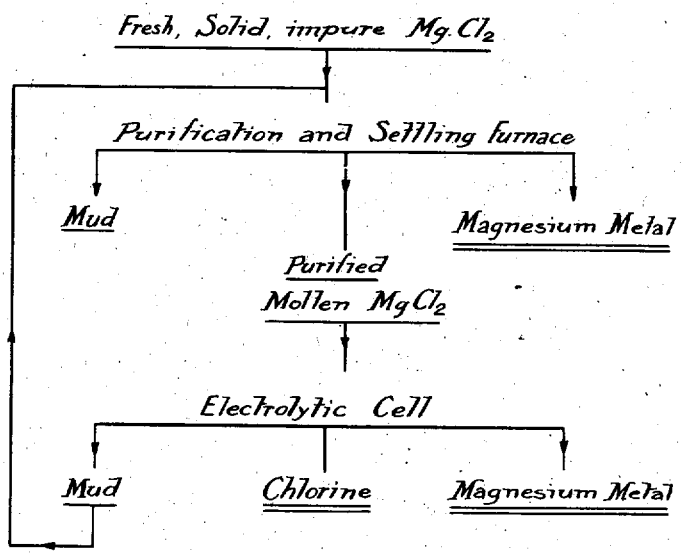

May 1, 1945.   R. LEPSOE ET AL   2,375,009
PROCESS FOR THE PURIFICATION OF MAGNESIUM CHLORIDE
Filed Jan. 21, 1941

Inventors
Robert Lepsoe
Basil Graham Hunt

Patented May 1, 1945

2,375,009

UNITED STATES PATENT OFFICE 2,375,009

PROCESS FOR THE PURIFICATION OF MAGNESIUM CHLORIDE

Robert Lepsoe and Basil Graham Hunt, Trail, British Columbia, Canada, assignors, by mesne assignments, to The Mathieson Alkali Works (Inc.), a corporation of Virginia Application January 21, 1941, Serial No. 375,254
In Canada February 7, 1940

5 Claims. (Cl. 204—70)

This invention relates to a process for the purification of molten metal chlorides and is more specifically directed to providing a simple and highly effective method for the purification of anhydrous magnesium chloride in the molten state.

Processes for the electrolysis of molten magnesium chloride to obtain metallic magnesium therefrom have been in relatively widespread use for many years past. It is also well known that magnesite (magnesium carbonate), which occurs in nature alone or in compounds such as dolomite ($MgCO_3.CaCO_3$), can be converted into chloride form and the resulting magnesium chloride electrolyzed to recover the metallic magnesium in substantially pure form.

For the successful electrolytic separation of magnesium from molten magnesium chloride electrolytes, the magnesium chloride must be substantially free from suspended solid impurities such as carbon, silica and magnesium oxide, or soluble impurities such as iron and aluminum in chloride form, which metals are below magnesium in the electromotive series. Preferably, the magnesium chloride should contain no water and a total of not more than 1% of such impurities. Magnesium chloride of this quality is suitable for direct addition to the electrolytic cell and recoveries of the order of 90% of the magnesium, with high current efficiency, can be obtained. To illustrate the importance of using a magnesium chloride electrolyte substantially free from impurities, including water, which latter tends to react with magnesium chloride or magnesium metal, or both, to form magnesium oxide, it is found that a recovery of only about 80% of the magnesium can be obtained from magnesium chloride containing 2% impurities, while a recovery of only 60% can be obtained from magnesium chloride containing 4% impurities. These lower recoveries are due to the retention of electrolyte and of metallic magnesium by magnesium oxide and other insoluble impurities, which form mud in the cell and which it is necessary to remove from the electrolytic cell during operation.

Magnesium chloride may be obtained by chlorinating materials such as magnesite ($MgCO_3$), or dolomite ($MgCO_3.CaCO_3$), in the presence of carbon. Magnesium chloride prepared in such a manner usually contains, in addition to a small amount of moisture, small amounts of other impurities such as magnesium oxide, silica and carbon in the form of suspended solids, and iron, aluminum and calcium in the dissolved form as chlorides, the amount of the latter being dependent on the amount thereof originally present in the magnesite or dolomite. As pointed out hereinabove, these impurities, which cause the formation of mud in the cell, must be substantially completely removed in order to obtain a high recovery of metallic magnesium, accompanied by a high current efficiency in the subsequent electrolytic step.

In order to effect the separation of the suspended solid impurities, such as magnesium oxide, silica and carbon, it has been suggested to pass the fresh, incoming molten magnesium chloride through a settling furnace wherein the suspended solid impurities are permitted to settle to the bottom of the furnace, the magnesium chloride being then separated therefrom by such means as decanting. This treatment may be continued through several settling furnaces until the substantially complete separation of solid impurities has been effected. In such processes, no procedure is suggested for separating the soluble impurities, such as iron, aluminum and calcium, which are present in chloride form and which, for the most part, remain with the molten magnesium chloride and pass to the electrolytic cell.

Electrolysis may be carried out in one or a series of cells containing positive and negative electrodes, or in a metal pot, such as cast steel, in which the metal shell acts as the negative electrode or cathode and a vertical, centrally located electrode serves as the positive electrode or anode. During electrolysis, chlorine is formed at the anode and may be recovered, if so desired, and returned to the chlorinating step of the process, while molten magnesium metal is formed at the cathode and, being lighter than the molten magnesium chloride electrolyte, rises to the surface of the bath from which it is removed, either intermittently or continuously. Any moisture present in the electrolyte tends to form an equivalent quantity of magnesium oxide which, together with the silica, carbon and magnesium oxide already present in the electrolyte, settles to the bottom of the cell as mud. A portion of the chlorides of iron and aluminum may be volatilized; the iron and aluminum content of the remaining portion is precipitated by the magnesium metal present in the electrolyte. It will be seen that the presence of the metal chloride impurities in the electrolyte is very undesirable due to their deleterious effect upon the quantity of metallic magnesium recovered, and upon the current efficiency, besides increasing The mud, formed during electrolysis, settles to the bottom of the cell and a portion of the magnesium metal produced by the electrolysis is entrained by this mud. Under these conditions, an appreciable percentage of metallic magnesium is found in the mud and removed with it. The percentage of magnesium metal thus recovered with the mud is dependent mainly upon the extent to which impurities are present in the original chloride fed to the electrolytic cell and, to some extent, also, on the amount of impurities, such as magnesium oxide and carbon, which may enter the electrolyte during electrolysis.

It has been found that the purification of the freshly prepared magnesium chloride, which may contain small amounts of impurities, such as moisture, magnesium oxide, silica, carbon, iron, aluminum and calcium, can be accomplished in a simple, inexpensive and highly effective manner by treating the magnesium chloride in an externally or internally heated purification furnace. It is preferred to maintain the temperature of the charge contained in this furnace within the range of from 725° C. to 775° C., the charge being sufficiently fluid and the loss of magnesium chloride through volatilization being negligible within this temperature range. Mud, withdrawn from the electrolytic cell, containing up to about 10% metallic magnesum, together with varying percentages of magnesium oxide, silica, carbon, iron, aluminum and entrained chloride electrolyte, is added to the charge in the purification furnace. The mud may contain, in addition to magnesium and calcium chlorides, a certian proportion of the sodium or potassium chlorides, which may have been added to the electrolyte. The metallic magnesium carried by the mud is effective in replacing, from their respective chlorides, the metallic impurities, particularly iron and aluminum, which are present in the molten magnesium chloride, and are below magnesium in the electromotive series.

Inasmuch as calcium is above magnesium in the electromotive series, it remains with the molten purified chloride passed to the electrolytic cell. The calcium originates in the calcium oxide which is present in the charge fed into the chlorinating furnace and the chloride produced therefrom contains all this calcium. As the electrolysis of the molten chloride proceeds, the calcium content of the electrolyte gradually builds up to a point at which the electrolyte must be discarded.

The impurities precipitated from the fresh, molten magnesium chloride by the action of the metallic magnesium, together with all the insoluble impurities of the mud and of the fresh magnesium chloride, settle to the bottom of the purification furnace, from which they may be removed periodically. Metallic magnesium, in excess of that required for the reactions, collects at the surface of the bath, from which it may be removed, or passed to the electrolytic cell with the purified chloride.

The purified magnesium chloride may be passed directly to the electrolytic step of the process or to a second holding or settling furnace, from which it is withdrawn, as required, and passed to the electrolytic cell.

The mud and precipitated metallic impurities, settling to the bottom of the purification furnace, are removed periodically by a perforated ladle or other suitable means, and may be leached with water to dissolve and recover magnesium chloride or may be treated by other means for the recovery of the metal values.

The following analyses are illustrative of the manner in which the metallic magnesium, contained in the mud withdrawn from the electrolytic cell, is effective in precipitating metallic impurities from the molten charge, and of the manner in which the chloride is purified:

|  | Per cent MgO | Per cent SiO$_2$ | Per cent Al | Per cent Fe | Per cent C |
|---|---|---|---|---|---|
| Chloride charge to purification furnace | 0.7 | 0.4 | 0.1 | 0.2 | 0.6 |
| Purified chloride | 0.1 | 0.1 | Trace | <0.1 | 0.07 |

It has been found possible, by the method disclosed hereinabove, to purify the molten chloride charge to such an extent that, on being charged into the electrolytic cell, it is substantially free from the impurities, moisture, magnesium oxide, carbon, silica, iron, and aluminum, and such other metallic impurities as may be below magnesium in the electromotive series, which impurities were either all or in part present in the charge originally fed into the purification furnace, or were picked up subsequently. In this manner, it is possible to improve the operation of the cell, the current efficiency and the metal recovery.

Figure 2:
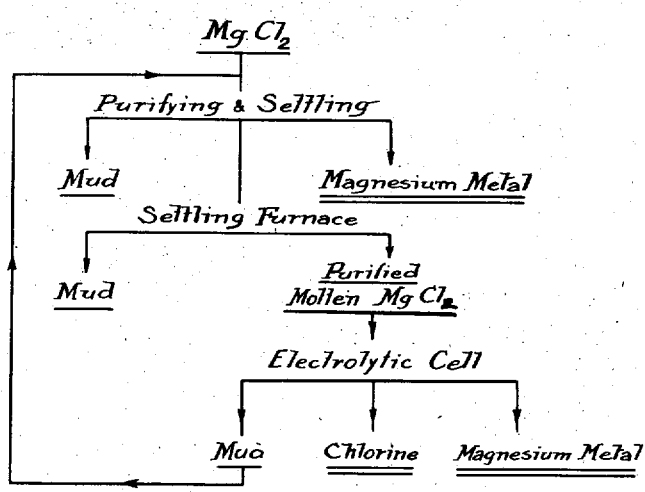

Alternative methods for carrying out the present invention are illustrated in the attached flow sheet. In the modification illustrated in Figure 1, the purification treatment and the complete separation of the solid and precipitated impurities are effected in the purification and settling furnace. In the modification illustrated in Figure 2, the purification treatment and the separation of a portion of the solid and precipitated impurities are effected in the purification and settling furnace, after which the fused chloride is passed to a settling furnace wherein the remainder of the solid and precipitated impurities are separated.

It will be clearly understood, of course, that the examples used hereinabove to illustrate the operation of the method are not to be construed as limiting the scope of the invention as defined in the appended claims.

What we claim as new and desire to protect by Letters Patent of the United States is:

1. In a process for the electrolytic production of metallic magnesium from fused magnesium chloride electrolyte, the method of purifying the magnesium chloride electrolyte prior to electrolysis which comprises charging the magnesium chloride into a purification furnace maintained at a temperature above the melting temperature of the charge contained therein, adding to the molten charge cell mud separately withdrawn from the electrolytic step of the process, said cell mud containing entrained metallic magnesium, the metallic magnesium causing precipitation of the soluble metal impurities which are below magnesium in the electromotive series of the elements and which are present in the magnesium chloride; permitting the impurities, including those which are precipitated by the magnesium metal contained in the cell mud, to settle as mud to the bottom of the purification furnace, and separately withdrawing the purified magnesium chloride electrolyte and the settled mud.

2. In a process for the electrolytic production of metallic magnesium from fused magnesium chloride electrolyte, the method of purifying the magnesium chloride electrolyte prior to electrolysis which comprises charging the magnesium chloride into a purification furnace maintained at a temperature above the melting temperature of the charge contained therein, adding to the molten charge cell mud separately withdrawn from the electrolytic step of the process, said cell mud containing entrained metallic magnesium, the metallic magnesium causing the precipitation of the soluble metal impurities which are below magnesium in the electromotive series of the elements and which are present in the magnesium chloride; permitting a portion of the impurities, including those which are precipitated by the magnesium metal contained in the cell mud, to settle as mud to the bottom of the purification furnace, separately withdrawing the fused magnesium chloride and the settled mud, pass'ng the fused magnesium chloride to a settling furnace wherein the remainder of the suspended impurities are permitted to settle, and separately withdrawing the purified magnesium chloride electrolyte and the settled mud from the settl'ng furnace.

3. In a process for the electrolytic production of metallic magnesium from fused magnesium chloride electrolyte, the method of purifying the magnesium chloride electrolyte prior to electrolysis which comprises charging the magnesium chloride into a purification furnace maintained at a temperature within the range of from 725° C. to 775° C., adding to the molten charge cell mud separately withdrawn from the electrolytic step of the process, said cell mud containing entrained metallic magnesium, the metallic magnesium causing the precipitation of the soluble metal impurities which are below magnesium in the electromotive series of the elements and which are present in the magnesium chloride; permitt'ng the impurities, including those which are precipitated by the magnesium metal contained in the cell mud, to settle as mud to the bottom of the purification furnace, and separately withdrawing the purified magnesium chloride electrolyte and the settled mud.

4. In a process for the electrolytic production of metallic magnesium from fused magnesium chloride electrolyte, the method of purifying the magnesium chloride electrolyte prior to electrolysis which comprises charging the magnesium chloride into a purification furnace maintained at a temperature within the range of from 725° C. to 775° C., adding to the molten charge cell mud separately withdrawn from the electrolytic step of the process, said cell mud containing entrained metallic magnesium, the metallic magnesium causing the precipitation of the soluble metal impurities which are below magnesium in the electromotive series of the elements and which are present in the magnesium chloride; permitting a portion of the impurities, including those which are precipitated by the magnesium metal contained in the cell mud, to settle as mud to the bottom of the purification furnace, separately withdrawing the fused magnesium chloride and the settled mud, passing the fused magnesium chloride to a settling furnace wherein the remainder of the suspended impurities are permitted to settle, and separately withdrawing the purified magnesium chloride electrolyte and the settled mud from the settling furnace.

5. In a process for the electrolytic production of metallic magnesium from fused magnesium chloride electrolyte, the method of purifying the magnesium chloride electrolyte prior to electrolysis which comprises charging the magnesium chloride into a purification furnace maintained at a temperature above the melting temperature of the charge contained therein, adding to the molten charge a metal chloride, selected from the group consisting of sodium chloride and potassium chloride, and cell mud separately withdrawn from the electrolytic step of the process, said cell mud containing entrained metallic magnesium, the metallic magnesium causing the precipitation of the soluble metal impurities which are below magnesium in the electromotive series of the elements and which are present in the magnesium chloride; permitting the impurities, including those which are precipitated by the magnesium metal contained in the cell mud, to settle as mud to the bottom of the purification furnace, and separately withdrawing the purified magnesium chloride electrolyte and the settled mud.

ROBERT LEPSOE.
BASIL GRAHAM HUNT.

CERTIFICATE OF CORRECTION.

Patent No. 2,375,009. May 1, 1945.

ROBERT LEPSOE, ET AL.

It is hereby certified that error appears in the printed specification of the above numbered patent requiring correction as follows: Page 1, first column, line 13, for the formula "(MgCO$_3$.CACO$_3$)" read --(MgCO$_3$.CaCO$_3$)--; page 2, first column, line 29, for "metallic magnesum" read --metallic magnesium--; and that the said Letters Patent should be read with this correction therein that the same may conform to the record of the case in the Patent Office.

Signed and sealed this 7th day of August, A. D. 1945.

Leslie Frazer (Seal)   Acting Commissioner of Patents.

chloride into a purification furnace maintained at a temperature above the melting temperature of the charge contained therein, adding to the molten charge cell mud separately withdrawn from the electrolytic step of the process, said cell mud containing entrained metallic magnesium, the metallic magnesium causing the precipitation of the soluble metal impurities which are below magnesium in the electromotive series of the elements and which are present in the magnesium chloride; permitting a portion of the impurities, including those which are precipitated by the magnesium metal contained in the cell mud, to settle as mud to the bottom of the purification furnace, separately withdrawing the fused magnesium chloride and the settled mud, passing the fused magnesium chloride to a settling furnace wherein the remainder of the suspended impurities are permitted to settle, and separately withdrawing the purified magnesium chloride electrolyte and the settled mud from the settling furnace.

3. In a process for the electrolytic production of metallic magnesium from fused magnesium chloride electrolyte, the method of purifying the magnesium chloride electrolyte prior to electrolysis which comprises charging the magnesium chloride into a purification furnace maintained at a temperature within the range of from 725° C. to 775° C., adding to the molten charge cell mud separately withdrawn from the electrolytic step of the process, said cell mud containing entrained metallic magnesium, the metallic magnesium causing the precipitation of the soluble metal impurities which are below magnesium in the electromotive series of the elements and which are present in the magnesium chloride; permitting the impurities, including those which are precipitated by the magnesium metal contained in the cell mud, to settle as mud to the bottom of the purification furnace, and separately withdrawing the purified magnesium chloride electrolyte and the settled mud.

4. In a process for the electrolytic production of metallic magnesium from fused magnesium chloride electrolyte, the method of purifying the magnesium chloride electrolyte prior to electrolysis which comprises charging the magnesium chloride into a purification furnace maintained at a temperature within the range of from 725° C. to 775° C., adding to the molten charge cell mud separately withdrawn from the electrolytic step of the process, said cell mud containing entrained metallic magnesium, the metallic magnesium causing the precipitation of the soluble metal impurities which are below magnesium in the electromotive series of the elements and which are present in the magnesium chloride; permitting a portion of the impurities, including those which are precipitated by the magnesium metal contained in the cell mud, to settle as mud to the bottom of the purification furnace, separately withdrawing the fused magnesium chloride and the settled mud, passing the fused magnesium chloride to a settling furnace wherein the remainder of the suspended impurities are permitted to settle, and separately withdrawing the purified magnesium chloride electrolyte and the settled mud from the settling furnace.

5. In a process for the electrolytic production of metallic magnesium from fused magnesium chloride electrolyte, the method of purifying the magnesium chloride electrolyte prior to electrolysis which comprises charging the magnesium chloride into a purification furnace maintained at a temperature above the melting temperature of the charge contained therein, adding to the molten charge a metal chloride, selected from the group consisting of sodium chloride and potassium chloride, and cell mud separately withdrawn from the electrolytic step of the process, said cell mud containing entrained metallic magnesium, the metallic magnesium causing the precipitation of the soluble metal impurities which are below magnesium in the electromotive series of the elements and which are present in the magnesium chloride; permitting the impurities, including those which are precipitated by the magnesium metal contained in the cell mud, to settle as mud to the bottom of the purification furnace, and separately withdrawing the purified magnesium chloride electrolyte and the settled mud.

ROBERT LEPSOE.
BASIL GRAHAM HUNT.

CERTIFICATE OF CORRECTION.

Patent No. 2,375,009. May 1, 1945.

ROBERT LEPSOE, ET AL.

It is hereby certified that error appears in the printed specification of the above numbered patent requiring correction as follows: Page 1, first column, line 13, for the formula "($MgCO_3.CACO_3$)" read --($MgCO_3.CaCO_3$)--; page 2, first column, line 29, for "metallic magnesum" read --metallic magnesium--; and that the said Letters Patent should be read with this correction therein that the same may conform to the record of the case in the Patent Office.

Signed and sealed this 7th day of August, A. D. 1945.

Leslie Frazer (Seal) Acting Commissioner of Patents.